(12) United States Patent
Dinan et al.

(10) Patent No.: US 12,101,785 B2
(45) Date of Patent: *Sep. 24, 2024

(54) RECEIVING UPLINK DATA VIA A TRANSMISSION TIME INTERVAL OF AN UNLICENSED CELL

(71) Applicant: Ofinno, LLC, Reston, VA (US)

(72) Inventors: Esmael Hejazi Dinan, McLean, VA (US); Alireza Babaei, Fairfax, VA (US)

(73) Assignee: Ofinno, LLC, Reston, VA (US)

(*) Notice: Subject to any disclaimer, the term of this patent is extended or adjusted under 35 U.S.C. 154(b) by 139 days.

This patent is subject to a terminal disclaimer.

(21) Appl. No.: 17/868,301

(22) Filed: Jul. 19, 2022

(65) Prior Publication Data

US 2022/0353854 A1 Nov. 3, 2022

Related U.S. Application Data

(63) Continuation of application No. 16/860,414, filed on Apr. 28, 2020, now Pat. No. 11,412,498, which is a
(Continued)

(51) Int. Cl.
*H04L 12/28* (2006.01)
*H04L 5/00* (2006.01)
(Continued)

(52) U.S. Cl.
CPC .......... *H04W 72/23* (2023.01); *H04L 5/0091* (2013.01); *H04L 27/0006* (2013.01);
(Continued)

(58) Field of Classification Search
CPC ................ H04W 72/0446; H04W 74/0808
(Continued)

(56) References Cited

U.S. PATENT DOCUMENTS

2017/0019915 A1  1/2017 Nogami et al.
2017/0223635 A1  8/2017 Dinan
(Continued)

OTHER PUBLICATIONS

R1-151302; 3GPP TSG RAN WG1 Meeting #80bis; Belgrade, Serbia, Apr. 20-24, 2015; Agenda Item: 7.2.4.2; Source: Huawei, HiSilicon; Title: Support of UL transmission for LAA; Document for: Discussion/Decision.
(Continued)

*Primary Examiner* — John Pezzlo
(74) *Attorney, Agent, or Firm* — Xin Gao; Kavon Nasabzadeh; Jacob L. Mangan

(57) ABSTRACT

A base station transmits a DCI comprising: an allocation of resource blocks for wireless device transmission of uplink data via a transmission time interval (TTI) of an unlicensed cell; an index indicating a starting position for the wireless device transmission of the uplink data, the index identifying one of pre-configured starting positions; and a field indicating an ending symbol for the wireless device transmission of the uplink data. The ending symbol is one of pre-configured ending symbols. The reception is based on a listen before talk (LBT) procedure indicating a clear channel before the starting position of the subframe.

18 Claims, 20 Drawing Sheets

Related U.S. Application Data continuation of application No. 16/259,213, filed on Jan. 28, 2019, now Pat. No. 10,645,685, which is a continuation of application No. 15/421,049, filed on Jan. 31, 2017, now Pat. No. 10,194,432.

(60) Provisional application No. 62/290,739, filed on Feb. 3, 2016.

(51) Int. Cl.
  *H04L 27/00* (2006.01)
  *H04W 72/0446* (2023.01)
  *H04W 72/23* (2023.01)
  *H04W 74/0808* (2024.01)
  *H04J 1/16* (2006.01)

(52) U.S. Cl.
  CPC ............. *H04W 72/0446* (2013.01); *H04W 74/0808* (2013.01); *H04L 5/001* (2013.01)

(58) Field of Classification Search
  USPC ..................................... 370/252, 329, 442
  See application file for complete search history.

(56) References Cited

U.S. PATENT DOCUMENTS

| | | | |
|---|---|---|---|
| 2017/0223675 A1 | 8/2017 | Dinan et al. | |
| 2017/0311322 A1* | 10/2017 | Kim | H04L 25/0224 |
| 2018/0084432 A1 | 3/2018 | Kwak et al. | |
| 2018/0227838 A1 | 8/2018 | Hayashi et al. | |
| 2018/0234988 A1 | 8/2018 | Shimezawa et al. | |
| 2018/0241525 A1 | 8/2018 | Ouchi et al. | |
| 2018/0323917 A1* | 11/2018 | Um | H04W 72/23 |
| 2018/0324604 A1 | 11/2018 | Yang et al. | |
| 2018/0351720 A1 | 12/2018 | Ouchi et al. | |
| 2020/0403724 A1* | 12/2020 | Fujishiro | H04L 1/0015 |
| 2021/0176736 A1 | 6/2021 | Harada et al. | |
| 2023/0199788 A1* | 6/2023 | Um | H04L 27/261 370/329 |

OTHER PUBLICATIONS

R1-151404; 3GPP TSG RAN WG1 #80bis; Apr. 20-24, 2015; Belgrade, Serbia; Agenda item: 7.2.4.2; Source: Qualcomm Incorporated; Title: Adaptive Frame Structure and DL-UL configuration for LAA; Document for: Discussion and Decision.
R1-151459; 3GPP TSG-RAN WG1 Meeting #80bis; Belgrade, Serbia, Apr. 20-24, 2015; Agenda Item: 7.2.4.2; Source: InterDigital Communications; Title: UL transmission for LAA; Document for: Discussion.
R1-151464; 3GPP TSG RAN WG1 Meeting #80bis; Belgrade, Serbia, Apr. 20-24, 2015; Source: Kyocera; Title: LAA UL Design; Agenda Item: 7.2.4.2; Document for: Discussion/Decision.
R1-151516; 3GPP TSG RAN WG1 meeting #80bis; Belgrade, Serbia, Apr. 20-24, 2015; Agenda Item: 7.2.4.2; Source: LG Electronics; Title: LBT operation for LAA UL; Document for: Discussion and decision.
R1-151627; 3GPP TSG RAN WG1 Meeting #80bis; Belgrade, Serbia, Apr. 20-24, 2015; Agenda item: 7.2.4.2; Source: Samsung; Title: Discussion on UL transmission for LAA; Document for: Discussion.
R1-151675; 3GPP TSG RAN WG1 Meeting #80bis; Belgrade, Serbia, Apr. 20-24, 2015; Source: Panasonic; Title: Discussion on UL transmission in LAA; Agenda Item: 7.2.4.2; Document for: Discussion and decision.
R1-151719; 3GPP TSG RAN WG1 Meeting #80bis; Belgrade, Serbia, Apr. 20-24, 2015; Agenda Item: 7.2.4.2; Source: ZTE; Title: Potential design for LAA UL transmission; Document for: Discussion and Decision.
R1-151750; 3GPP TSG-RAN WG1 #80bis; Belgrade, Serbia, Apr. 20-24, 2015; Agenda item: 7.2.4.2; Source: NVIDIA; Title: Flexible UL-DL transmission for LAA; Document for: Discussion and Decision.
R1-151841; 3GPP TSG-RAN WG1 Meeting #80bis; Belgrade, Serbia, Apr. 20-24, 2015; Agenda item: 7.2.4.2; Source: Nokia Networks; Title: On the PHY options for LAA UL operation; Document for: Discussion and Decision.
R1-151842; 3GPP TSG-RAN WG1 Meeting #80bis; Belgrade, Serbia, Apr. 20-24, 2015; Agenda item: 7.2.4.2; Source: Nokia Networks; Title: UL LBT and Configurable Frame Structure for UL/DL operation; Document for: Discussion and Decision.
R1-151958; 3GPP TSG RAN WG1 Meeting #80bis; Belgrade, Serbia, Apr. 20-24, 2015; Source: NTT DOCOMO, Inc., Title: Discussion on issues related to UL transmission in LAA; Agenda Item: 7.2.4.2; Document for: Discussion and Decision.
R1-151973; 3GPP TSG RAN WG1 meeting #80bis; Belgrade, Serbia, Apr. 20-24, 2015; Agenda Item: 7.2.4.2; Source: Institute for Information Industry (III), Title: On the Design of LAA Uplink Transmission; Document for: Discussion and decision.
R1-152094; 3GPP TSG RAN WG1 Meeting #80-bis; Belgrade, Serbia, Apr. 20-24, 2015; Source: ETRI; Title: Discussion on the UL transmission for LAA and the potential solution thereof; Agenda item: 7.2.4.2; Document for: Discussion and Decision.
R1-152470; 3GPP TSG RAN WG1 Meeting #81; Fukuoka, Japan, May 25-29, 2015; Agenda Item: 6.2.4.3; Source: Huawei, HiSilicon; Title: Frame structure for LAA DL and UL transmission operation; Document for: Discussion/Decision.
R1-152579; 3GPP TSG RAN WG1 Meeting #81; Fukuoka, Japan, May 25-29, 2015; Source: CATT; Title: Frequency reuse for LBE; Agenda Item: 6.2.4.3; Document for: Discussion/Decision.
R1-152580; 3GPP TSG RAN WG1 Meeting #81; Fukuoka, Japan, May 25-29, 2015; Source: CATT, CATR; Title: Frame structure considerations for LAA; Agenda Item: 6.2.4.3; Document for: Discussion/Decision.
R1-152649; 3GPP TSG RAN WG1 Meeting #81; Fukuoka, Japan, May 25-29, 2015; Agenda Item: 6.2.4.3; Source: Intel Corporation; Title: On the LAA UL: LBT, scheduling, and sub-frame structure; Document for: Discussion/Decision.
R1-152737; 3GPP TSG RAN WG1 meeting #81; Fukuoka, Japan, May 25-29, 2015; Agenda Item: 6.2.4.3; Source: LG Electronics; Title: Indication of DL/UL TX burst structure; Document for: Discussion and decision.
R1-152783; 3GPP TSG RAN WG1 #81; May 25-29, 2015, Fukuoka, Japan; Agenda item: 6.2.4.3; Source: Qualcomm Incorporated; Title: Adaptive Frame Structure and DL-UL configuration for LAA; Document for: Discussion and Decision.
R1-152786; 3GPP TSG RAN WG1 #81; May 25-29, 2015, Fukuoka, Japan; Agenda item: 6.2.4.3; Source: Qualcomm Incorporated; Title: UE procedure for receiving DL transmissions in LAA; Document for: Discussion and Decision.
R1-152817; 3GPP TSG RAN WG1 Meeting #81; Fukuoka, Japan, May 25-29, 2015; Agenda item: 6.2.4.3; Source: Nokia Networks, Title: UL LBT and Configurable Frame Structure for UL/DL operation; Document for: Discussion and Decision.
R1-152872; 3GPP TSG RAN WG1 Meeting #81; Fukuoka, Japan, May 25-29, 2015; Agenda item: 6.2.4.3; Source: Samsung; Title: Discussion on UL transmission for LAA; Document for: Discussion.
R1-152970; 3GPP TSG RAN WG1 Meeting #81; Fukuoka, Japan, May 25-29, 2015; Agenda Item: 6.2.4.3; Source: ZTE; Title: Overview on LAA UL; Document for: Discussion and Decision.
R1-152971; 3GPP TSG RAN WG1 Meeting #81; Fukuoka, Japan, May 25-29, 2015; Source: ZTE; Title: Remaining Issues on LAA UL; Agenda Item: 6.2.4.3; Document for: Discussion and Decision.
R1-152990; 3GPP TSG RAN WG1 Meeting #81; Fukuoka, Japan, May 25-29, 2015; Title: LBT and Frame Structure Design for LAA with DL and UL; Source: Alcatel-Lucent Shanghai Bell, Alcatel-Lucent; Agenda Item: 6.2.4.3; Document for: Discussion/Decision.
3GPP TS 36.300 V13.2.0 (Dec. 2015); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 13).

(56) References Cited

OTHER PUBLICATIONS

3GPP TS 36.211 V13.0.0 (Dec. 2015); Technical Specification; 3rd Generation Partnership Project; Technical Specification Group Radio Access Network; Evolved Universal Terrestrial Radio Access (E-UTRA); Physical channels and modulation; (Release 13).

3GPP TS 36.212 V13.0.0 (Dec. 2015); Technical Specification; 3rd Generation Partnership Project; Technical Specification Group Radio Access Network; Evolved Universal Terrestrial Radio Access (E-UTRA); Multiplexing and channel coding; (Release 13).

3GPP TS 36.321 V13.0.0 (Dec. 2015); Technical Specification; 3rd Generation Partnership Project; Technical Specification Group Radio Access Network; Evolved Universal Terrestrial Radio Access (E-UTRA); Medium Access Control (MAC) protocol specification; (Release 13).

3GPP TR 36.889 V1.0.1 (Jun. 2015); Technical Report; 3rd Generation Partnership Project; Technical Specification Group Radio Access Network; Study on Licensed-Assisted Access to Unlicensed Spectrum; (Release 13).

3GPP TS 36.331 V13.0.0 (Dec. 2015); Technical Specification; 3rd Generation Partnership Project; Technical Specification Group Radio Access Network; Evolved Universal Terrestrial Radio Access (E-UTRA); Radio Resource Control (RRC); Protocol specification; (Release 13).

3GPP TS 36.213 V13.0.1 (Jan. 2016); Release 13; pp. 7-318.

* cited by examiner

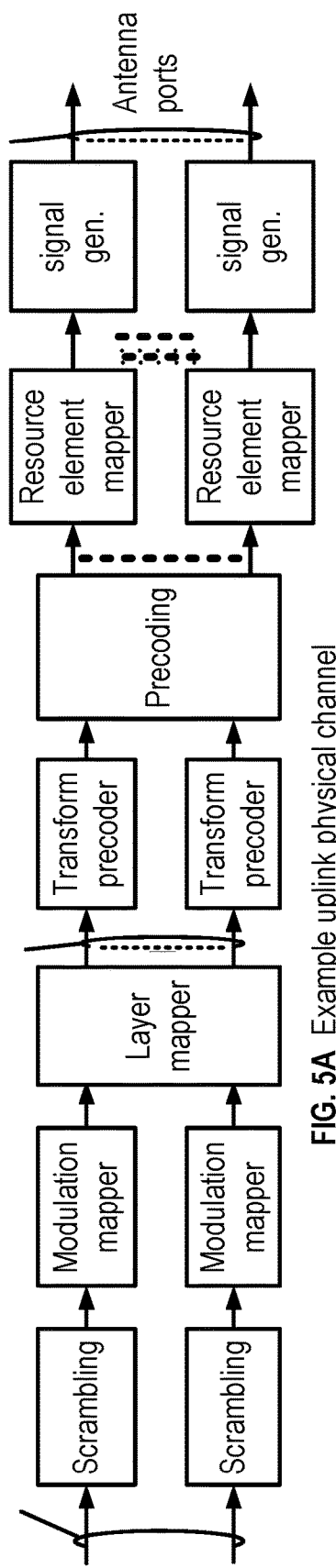
FIG. 5A Example uplink physical channel
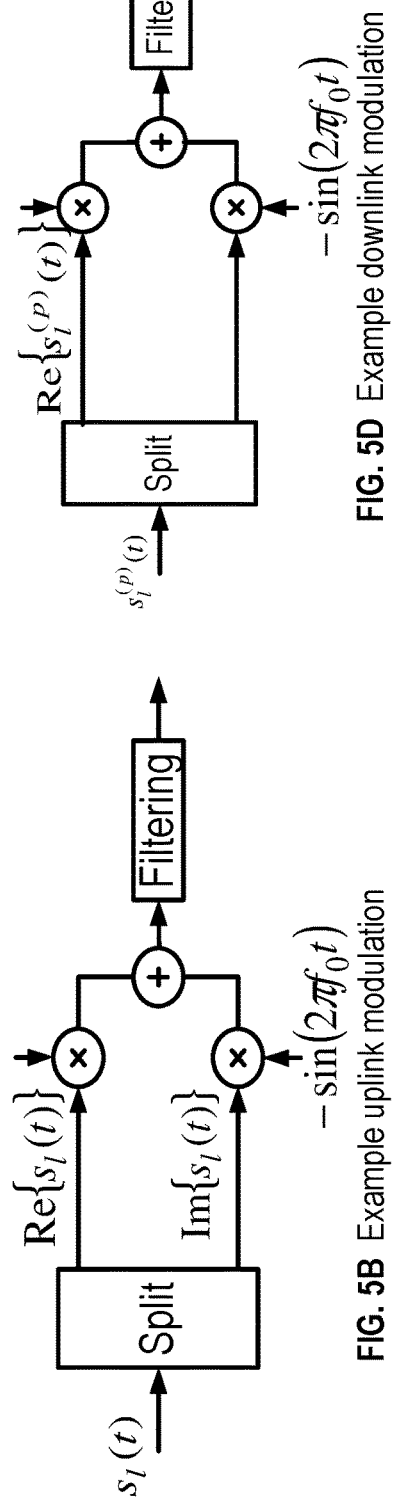
FIG. 5B Example uplink modulation
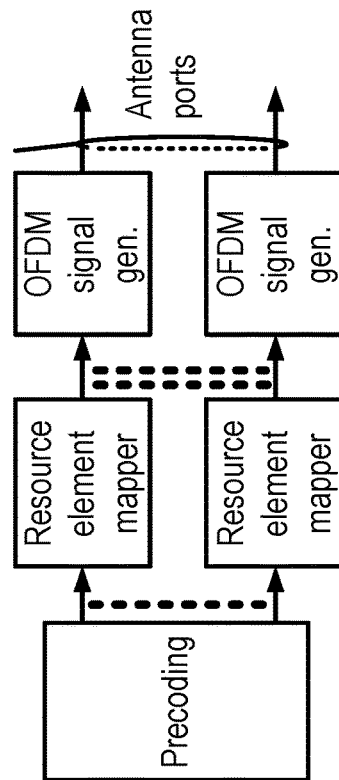
FIG. 5D Example downlink modulation
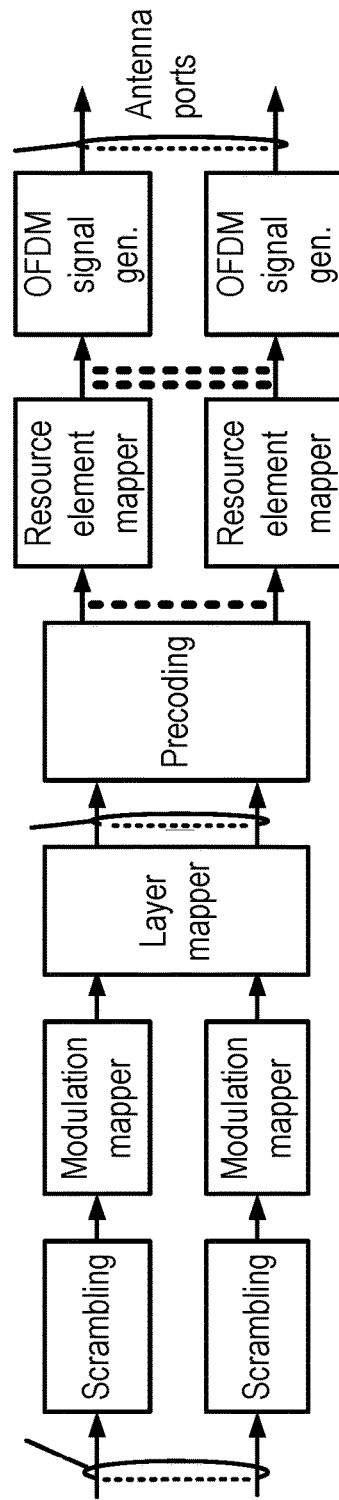
FIG. 5C Example downlink physical channel Dual-Connectivity at eNB FIG. 7 Dual-Connectivity- two MAC entities at UE side

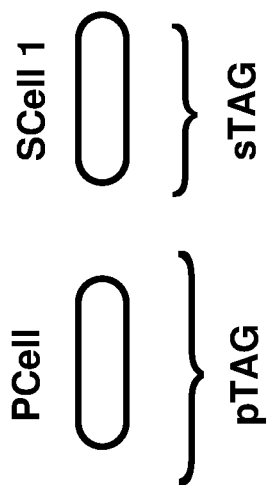
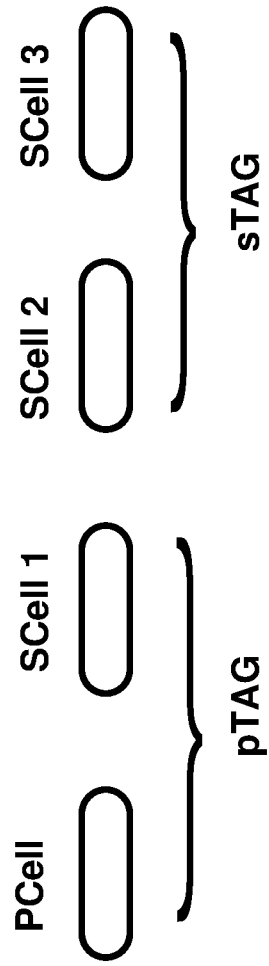
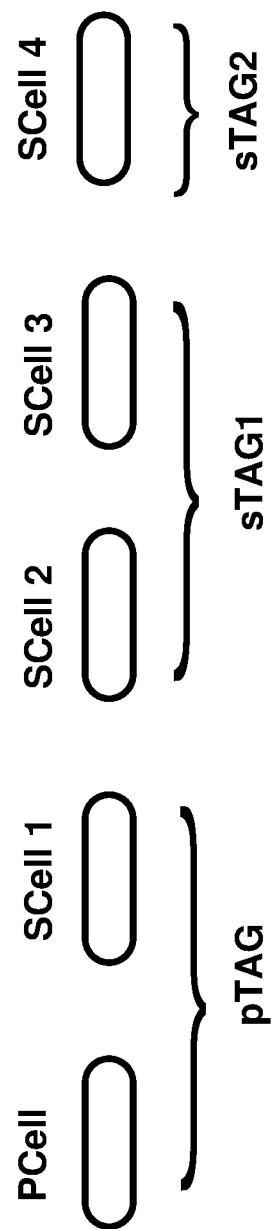
FIG. 8

RECEIVING UPLINK DATA VIA A TRANSMISSION TIME INTERVAL OF AN UNLICENSED CELL

CROSS-REFERENCE TO RELATED APPLICATIONS

This application is a continuation of U.S. patent application Ser. No. 16/860,414, filed Apr. 28, 2020, which is a continuation of U.S. patent application Ser. No. 16/259,213, filed Jan. 28, 2019 (now U.S. Pat. No. 10,645,685, issued May 5, 2020), which is a continuation of U.S. patent application Ser. No. 15/421,049, filed Jan. 31, 2017 (now U.S. Pat. No. 10,194,432, issued Jan. 29, 2019), which claims the benefit of U.S. Provisional Application No. 62/290,739, filed Feb. 3, 2016, all of which are hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

DETAILED DESCRIPTION OF EMBODIMENTS

Figure 1:
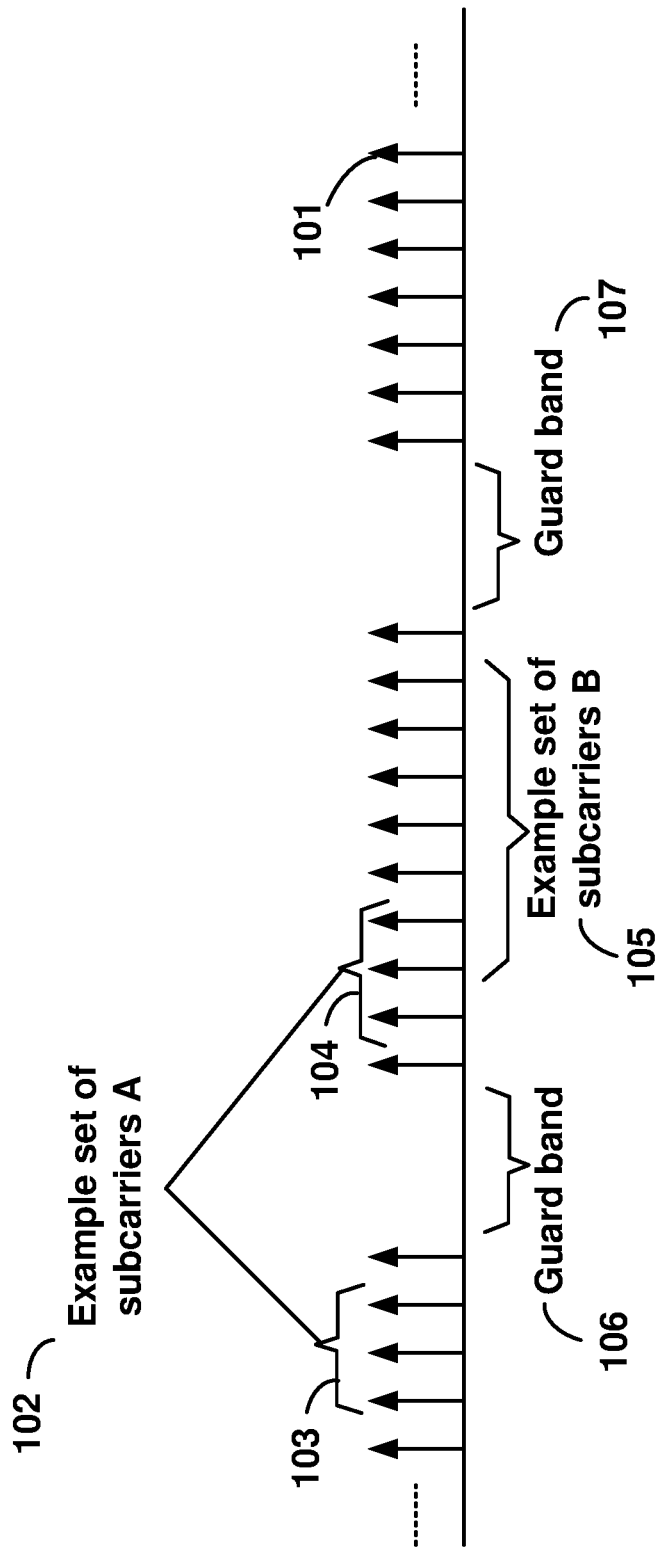
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
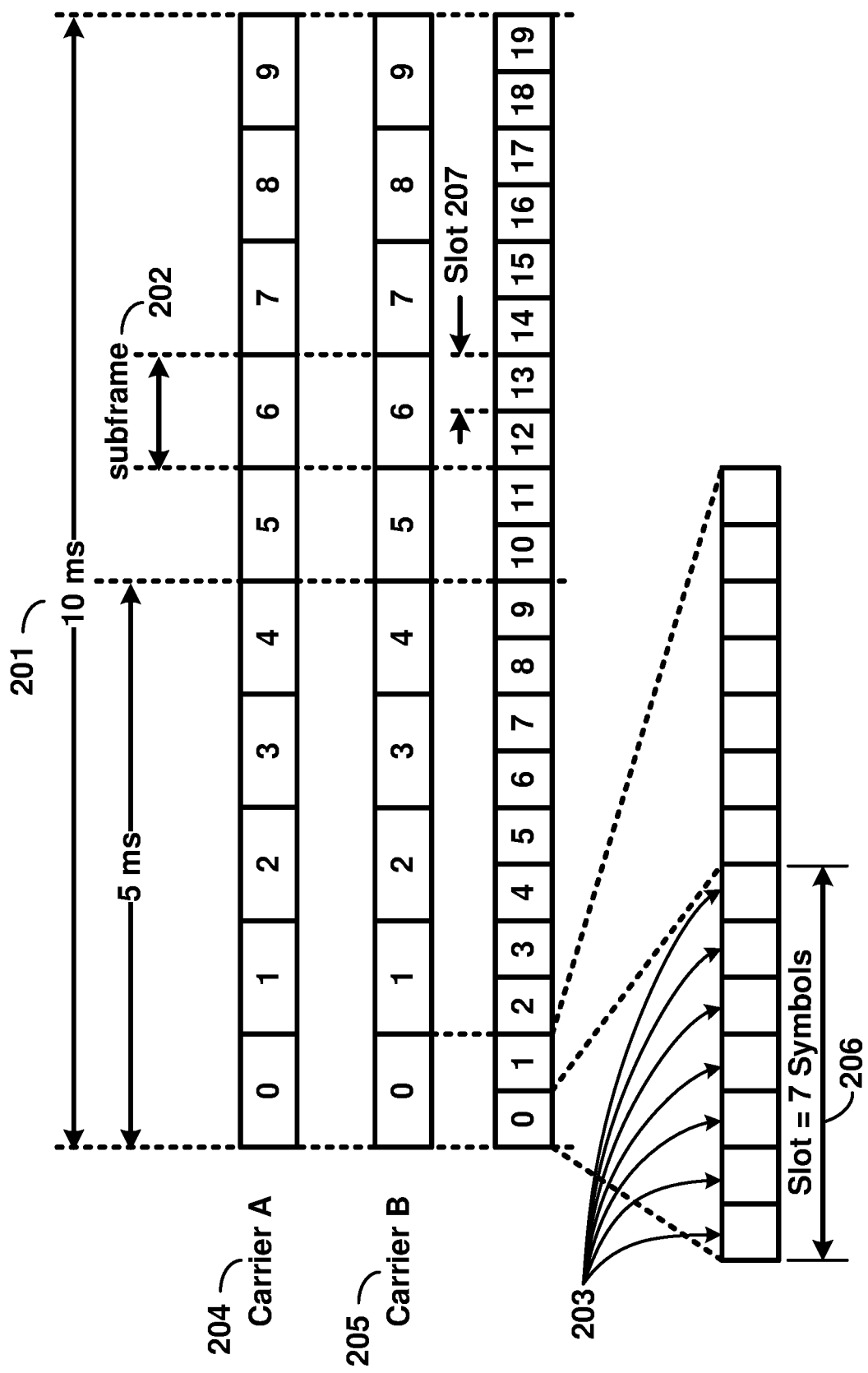
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
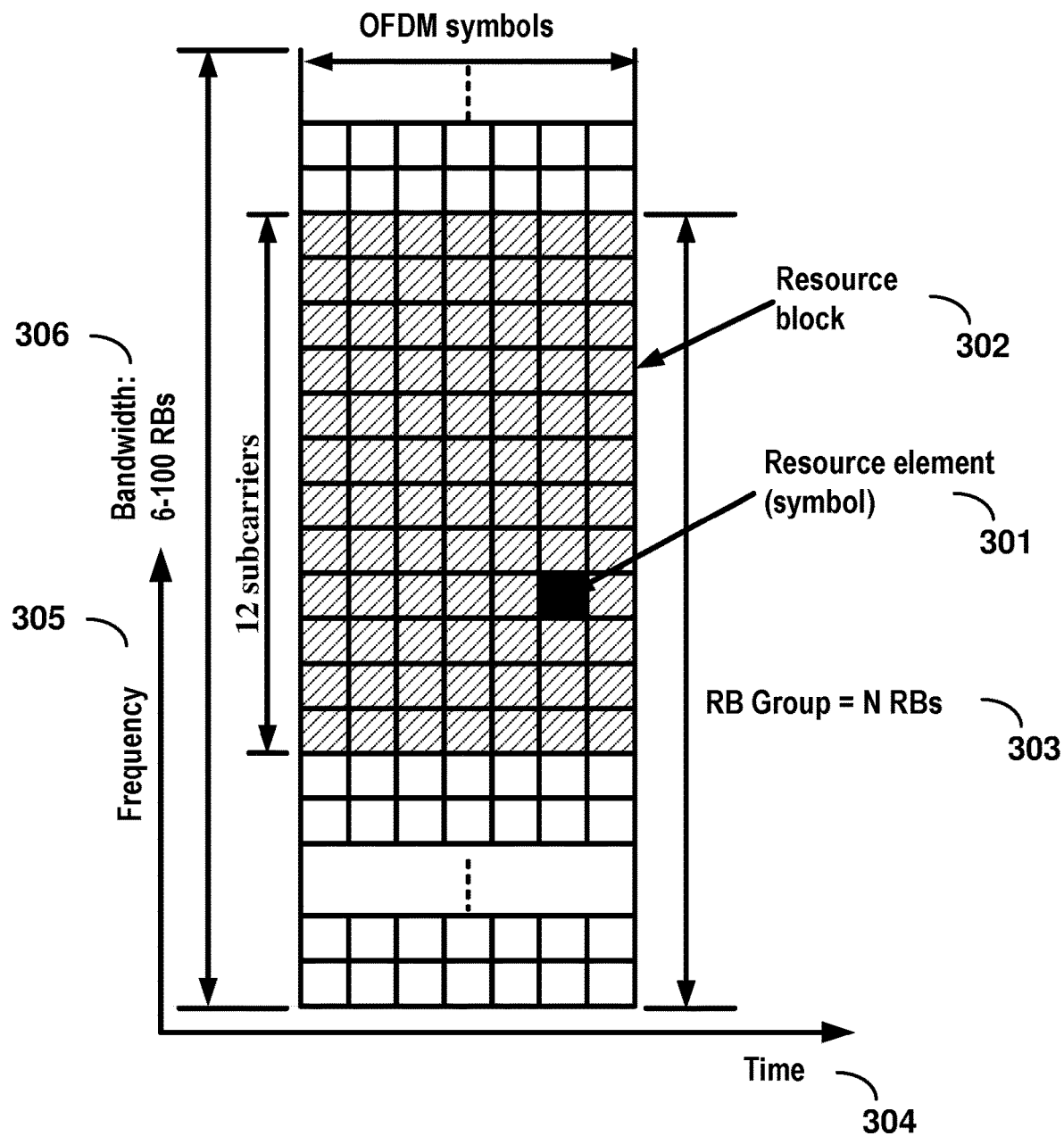
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
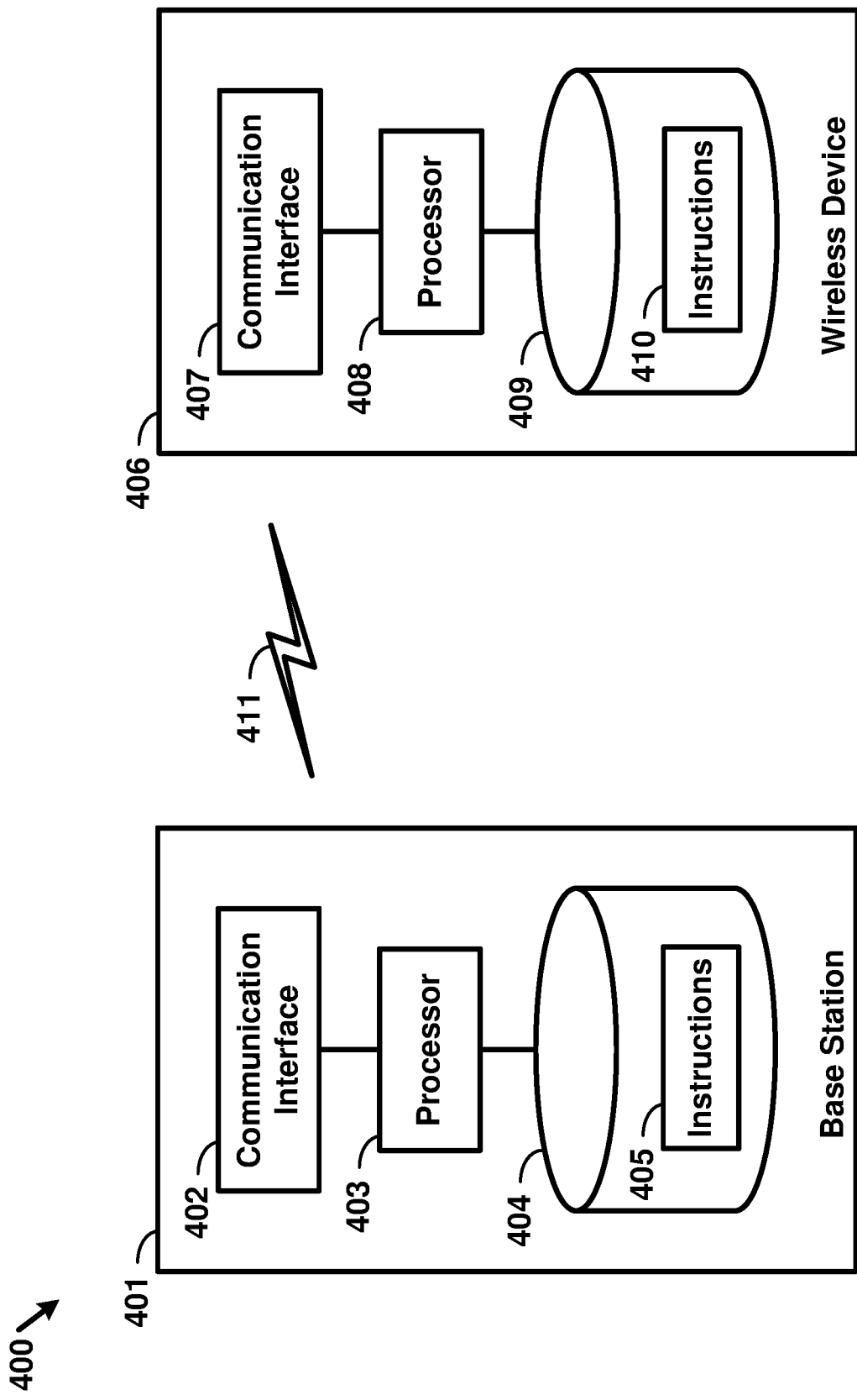
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
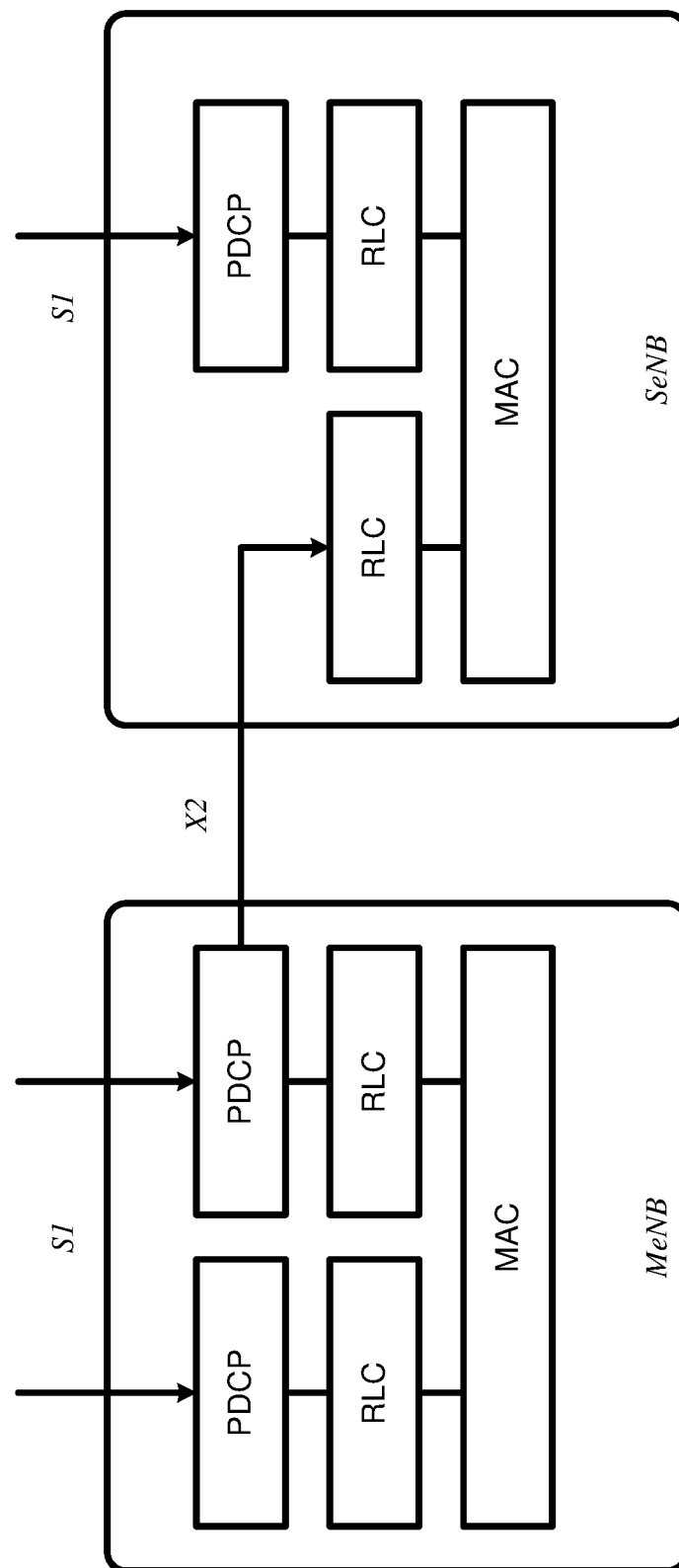
FIG. 6 is an example diagram for a protocol structure with CA and DC as per an aspect of an embodiment of the present disclosure.
Figure 7:
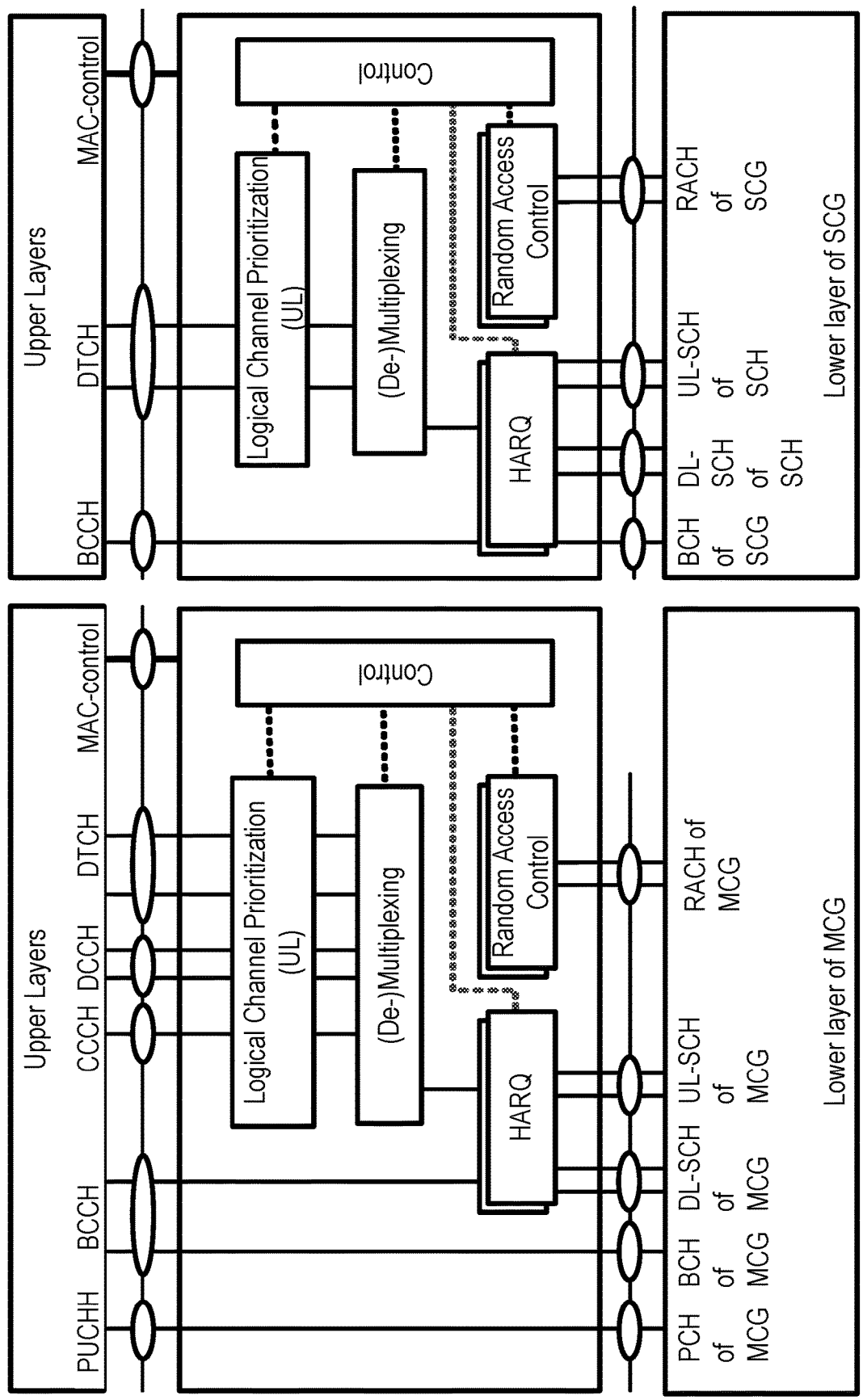
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
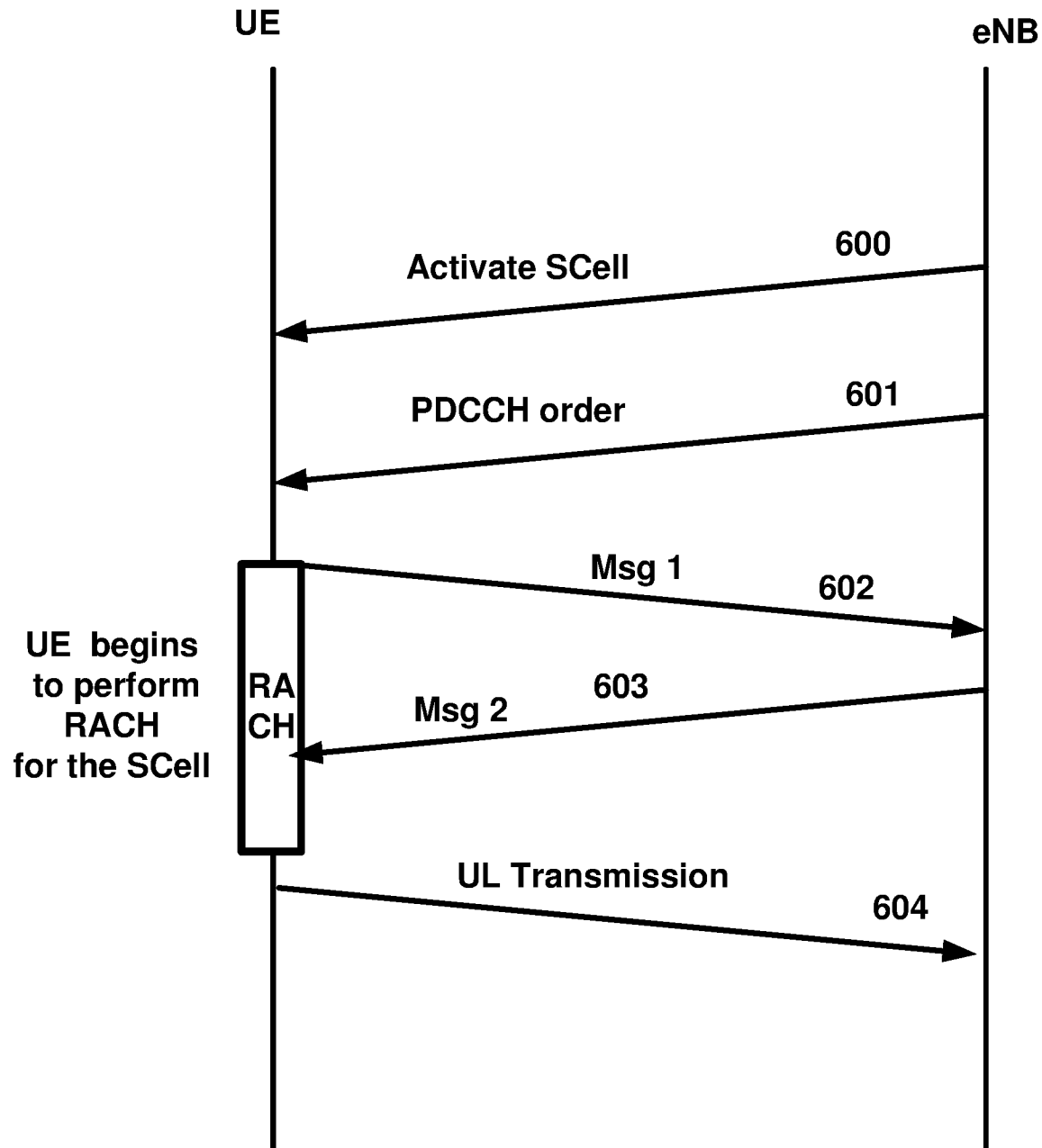
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RB s, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore needed for cellular operators to meet the increasing demand. Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
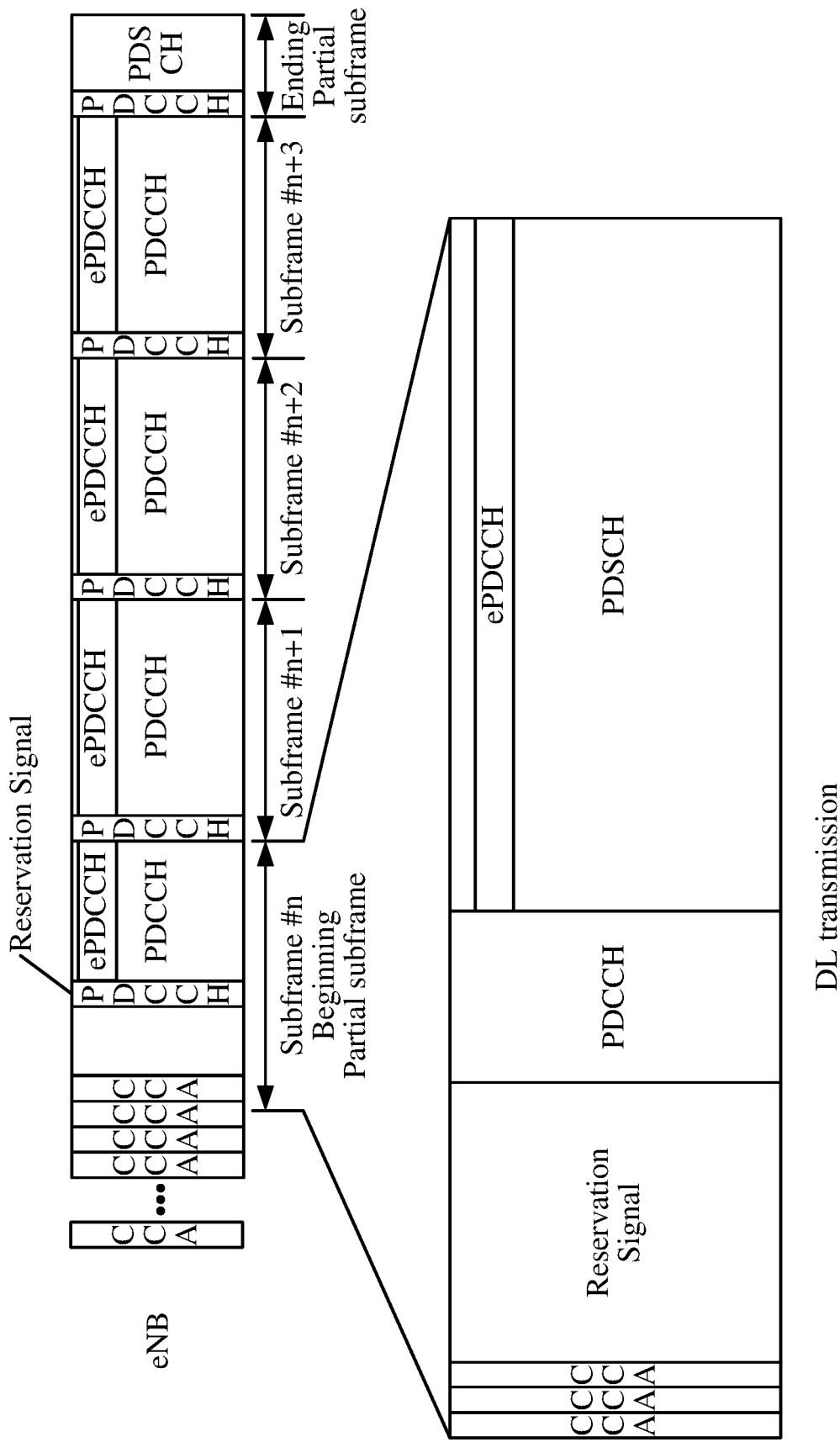
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one license cell and at least one unlicensed (for example, an LAA cell). The configuration parameters of a cell may, for example, comprise configuration parameters for physical channels, (for example, a ePDCCH, PDSCH, PUSCH, PUCCH and/or the like).

In an example embodiment, an LAA cell may support uplink transmissions by one or more UEs in a given subframe. Example embodiments provide mechanisms for one or more UEs to transmit uplink signals when an eNB transmits to the one or more UEs uplink DCI grant(s) to allocate resource blocks to the one or more UEs to transmit in the uplink in one or more subframes. In an example, when more than one UE is scheduled to transmit in the uplink in one or more subframes of a cell, a UE's transmission may not block another UE's LBT and/or transmission. Different UEs may be allocated different non-overlapping resource blocks. In an example, different UEs may employ overlapping RBs using MU-MIMO.

An eNB may transmit at least one RRC message to one or more UEs to configure one or more LAA cells, LBT parameters and/or uplink transmission parameters. One or more configuration parameters may be configured by one or more RRC messages. Example configuration parameters are one or more LBT configuration parameters, and/or data/control signal transmission parameters. For example, one or more parameters of an LBT threshold may configured by an eNB. Example embodiments enhances LAA cell configuration and allows an eNB to semi-statically configure LBT parameters that control a wireless access procedure to an LAA cell.

An eNB may transmit uplink DCI grants to the one or more UEs for an uplink transmission on one or more LAA cells. To enable transmissions by multiple users in a subframe of an LAA cell, some form of LBT/transmission grouping may be implemented. The LBT mechanism may enable transmission from one or more UEs within a group. In an example, transmission from a UE may not block LBT and/or transmission of another UE in that group.

One or more UEs may be directed by an eNB to start performing an LBT procedure. The eNB may transmit one or more DCIs to one or more UEs. The one or more DCIs may indicate one or more configuration parameters such as the LBT starting time in a subframe, a reservation signal starting time, an allowed starting time for uplink data/control signal transmission in a subframe, and/or transmit power control parameters. An eNB may transmit to one or more UEs one or more (e)PDCCH DCIs causing configuration of one or more uplink transmission configuration parameters. Some of the configuration parameters may be coordinated (e.g. be the same) for one or more UEs within a group (e.g. LBT starting time, reservation signal starting time, and/or allowed starting time for uplink data/control signal transmission). For example, the eNB may transmit one or more DCIs indicating the same starting time for the LBT, the same reservation signal transmission timing, and/or the same data/control signal transmission timing by UEs in a group. There may be multiple implementation options for grouping multiple UEs.

In an example, an eNB may transmit to a first UE a first DCI comprising a first RBs allocation, transmission starting time, and/or LBT type (e.g. timing). The eNB may transmit to a second UE a second DCI comprising a second RBs allocation, with a same transmission starting time and/or LBT type (e.g. timing). When MU-MIMO is not used for the first and second UE, the first RBs allocation may not overlap with the second RBs allocation. When the first UE and second UE are configured for MU-MIMO, the first RBs allocation may be the same as the second RBs allocation.

In an example implementation, one or more RRC messages may comprise one or more configuration parameters for LBT grouping. UEs within a cell may be grouped through RRC configuration. An eNB may schedule UL resources for one or more UEs within a group and may coordinate their LBT time and/or procedure. UEs failing LBT within a time window may need to wait for the next allowed timeslot to perform LBT if scheduled again by the eNB. Multiple UEs in a group may perform LBT and may transmit at the same time. In an example configuration, the configuration of LBT start times may be coordinated and staggered across neighboring eNBs to increase probability of LBT success.

In an example implementation, dynamic LBT grouping based on scheduling may be implemented (e.g. without explicit RRC grouping configuration). Grouping of UEs for LBT may be implemented by the eNB scheduler. The eNB may schedule one or more UEs in the same subframe n. Multiple UEs scheduled for UL transmission on subframe n may start LBT substantially at a same time/symbol in a subframe. The scheduler may transmit uplink grant to one or more UEs. The one or more UEs receiving uplink grant for the same subframe, may start LBT at a specific starting time in the subframe. The one or more UEs receiving uplink grant for the same subframe, may start transmission of uplink reservation signal at a specific starting time in a subframe. The one or more UEs receiving uplink grant for the same subframe, may start transmission of uplink data signals at a specific starting time in a subframe. The coordination among one or more UEs grouped to transmit uplink data signals in the same subframe may be based on PDCCH uplink grants.

In an example, an eNB may transmit (e)PDCCH DCIs to one or more UEs in a first subframe and instruct one or more UEs to start an LBT process starting from a starting point in a second subframe. In an example, an eNB may transmit (e)PDCCH DCIs to one or more UEs in a first subframe and instruct one or more UEs to start uplink transmission from a starting point in a second subframe after the corresponding LBT succeeds. One or more UEs are directed by an eNB to start LBT may be scheduled to transmit in the same subframe. In this case LBT and transmission timing may be designed to enable users within a group not block each others LBT.

In an example, possible LBT starting time may be preconfigured and/or signaled to the UE, e.g. a first symbol/starting-time for UEs in a group. In an example, possible uplink transmission starting time may be preconfigured and/or signaled to the UE, e.g. a first symbol/starting-time for UEs in a group. If one or more UEs fail the LBT process during a period, the one or more UEs may not start a new LBT process until the one or more UEs receive further indication from the eNB, e.g. with a new uplink grant. In an example, one or more UEs which pass the LBT earlier than other UEs in the group may not transmit until the LBT period is over may transmit at an uplink transmission starting time. In an example, one or more UEs detecting a clear channel via the LBT process may start uplink transmission. The UEs may transmit a reservation signal until beginning of a permissible PUSCH transmission time, e.g. start of subframe n, start of a symbol, start of the second slot, etc.

In an example, the reservation signal from UE1 may not block LBT of other UE's in the same group and may be intended to block others UEs/other nodes (e.g. WiFi nodes) not in a group from acquiring the channel till UL data transmission starts. The reservation signal may be a wideband signal and may block other UEs/other nodes (e.g. WiFi nodes) from grabbing the channel. In an example, UEs in a group may send different reservation signals based on some UE specific configurations/codes such that eNB can detect who has passed the LBT. In an example, reservation signal may be one of or a combination of one of the following: arbitrary noise-like signal to keep the channel, DM-RS as configured by eNB, a sequence of SRS signals as configured by eNB, and/or a PRACH with a preamble configure by eNB.

In an example embodiment, one or more UEs may be configured not to transmit a reservation signal before transmitting uplink data. In an example embodiment, the possible starting symbols of the uplink data transmission in a subframe may be preconfigured (e.g. by RRC signaling or by implementation). In an example embodiment, the UE may be allowed to transmit at one or more starting symbols in a subframe. The UE may start transmission of uplink data at a permitted starting symbol depending on when LBT process indicate a clear channel.

Figure 11:
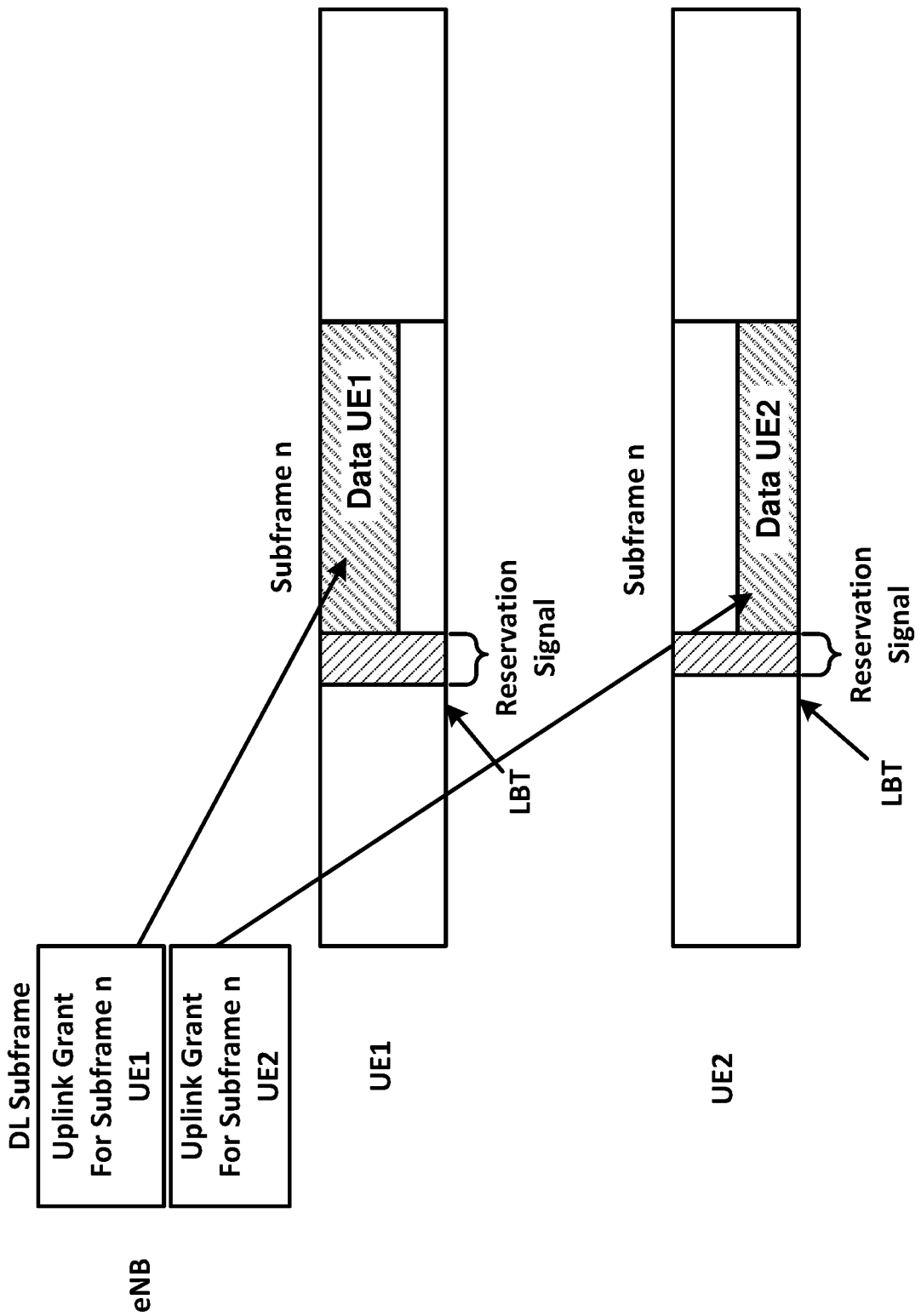
FIG. 11 is an example diagram depicting signal transmission as per an aspect of an embodiment of the present disclosure.

FIG. 11, shows an example uplink transmission for UE1 and UE2 on an LAA cell.

In an example implementation, variable LBT period (e.g. 50 micro second, longer than one symbol, etc) may be implemented. An eNB may indicate a starting symbol for LBT to one or more UEs (e.g. in the same group). An eNB may indicate a starting symbol for uplink transmission to one or more UEs (e.g. in the same group). If LBT fails during the first period (e.g. a first symbol), the UE may try LBT on next duration (e.g. next symbols) and may transmit data/reservation signals in UL when LBT passes within configured LBT window considering a maximum LBT duration period. UL data transmission may start at an allowed starting time within a scheduled subframe n. UE's which pass LBT before starting time within a scheduled subframe n may send a reservation signal till the beginning starting symbol in subframe n. For example, a UE scheduled for subframe n may start LBT up to L symbols (or L micro seconds) before starting time of subframe n and if LBT fails on first duration (e.g. symbol) but passes on second duration (e.g. symbol), the UE may send a reservation signal following LBT success and until the start of an uplink data transmission time.

In an example, some UEs within a group may be performing LBT procedure while others already succeeded and are transmitting reservation signals and/or data signals. In an example, the reservation signal and/or data signals from one member of a group may not block LBT of other members of the same group but may block other users/nodes (e.g. WiFi nodes) in the band until transmission of data on scheduled subframe n. In an example implementation, a UE may derive the configuration of a sub-band reservation signal from allocated physical RBs.

Figure 12:
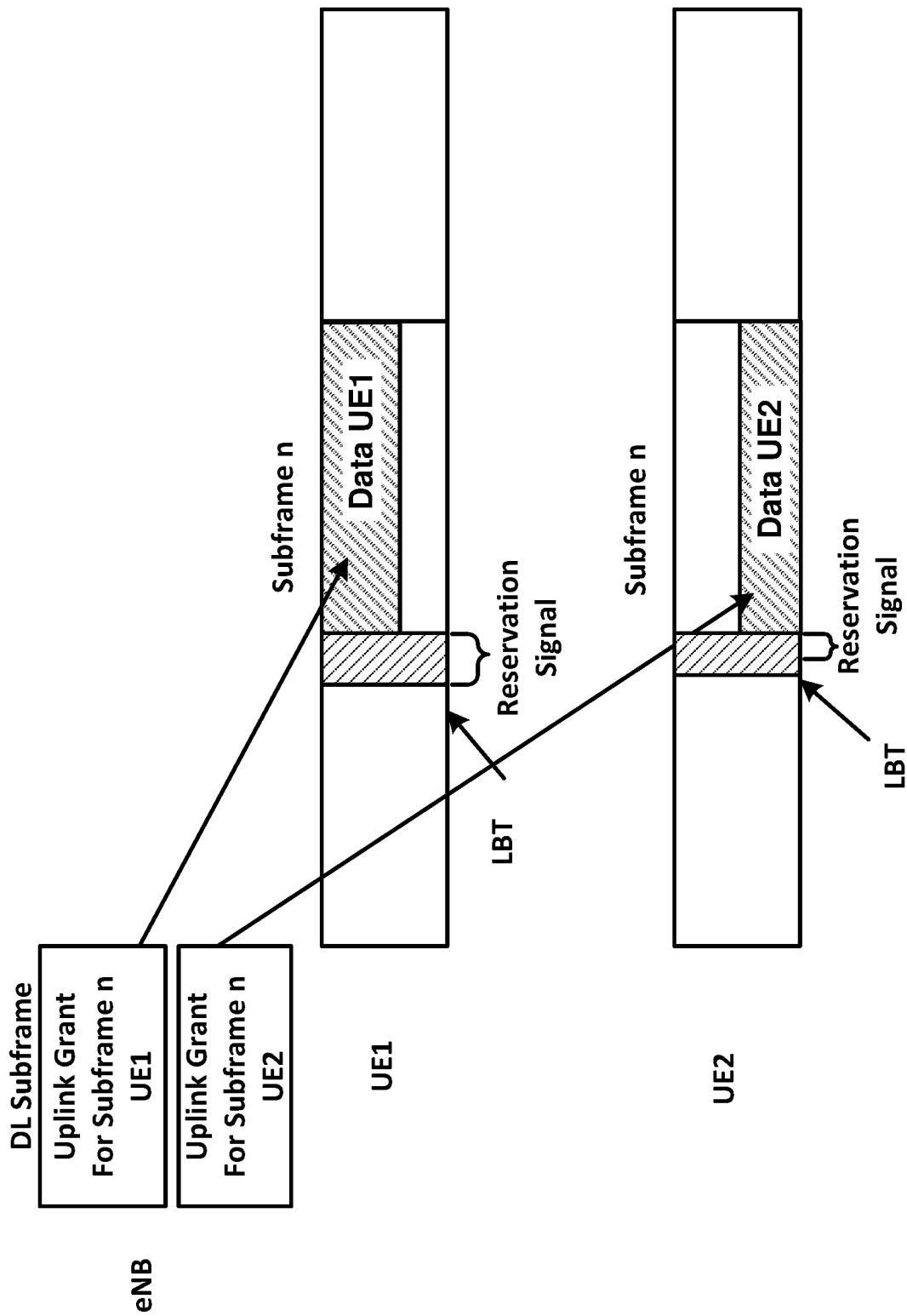
FIG. 12 is an example diagram depicting signal transmission as per an aspect of an embodiment of the present disclosure.

FIG. 12, shows an example uplink transmission for UE1 and UE2 on an LAA cell. UE1 and UE2 access the channel at different times.

Figure 15:
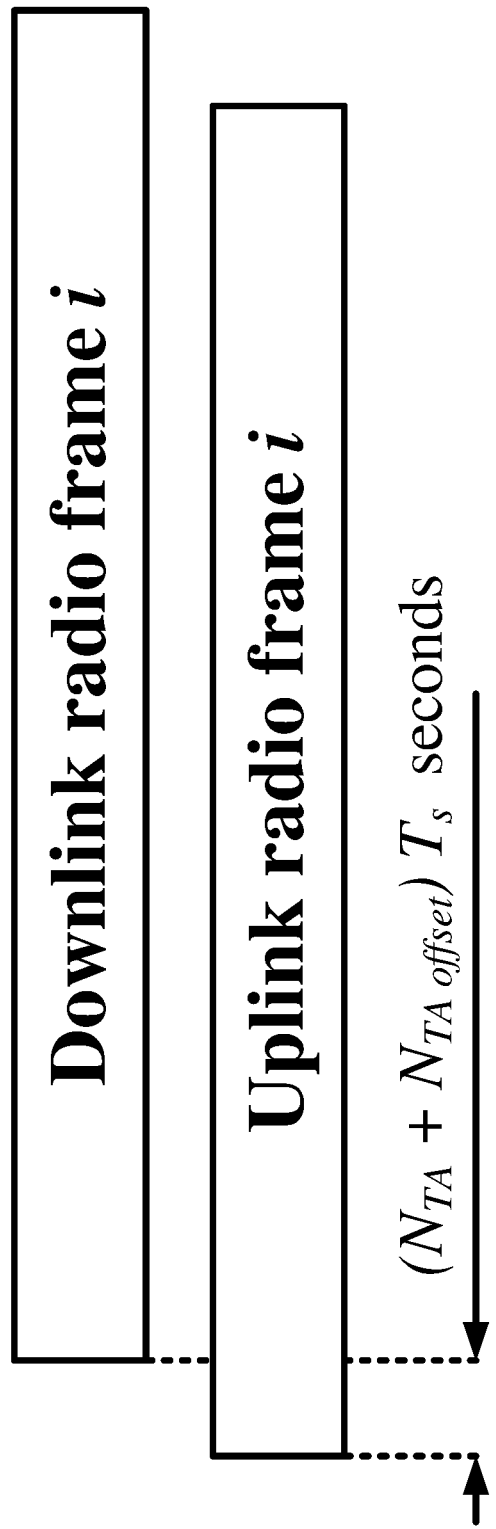
FIG. 15 is an example diagram depicting timing advance as per an aspect of an embodiment of the present disclosure.

In an LAA cell, uplink transmission timing is advanced by N_TA as shown in FIG. 15. A UE advances its transmission timing based on TACs received from the eNB, e.g. to compensate for round-trip propagation delay. This may imply that from a UE transmitter uplink subframe timing starts and ends earlier than downlink subframes. A guard period is needed when downlink transmission ends and uplink transmission starts in a UE. The eNB may not be able to calculate the exact N_TA amount, since the UE may autonomously change the N_TA in some scenarios. The guard period is required so that uplink and downlink transmission timings do not overlap in a TDD system.

In an example embodiment, the guard period may provide a transmission gap. Other UEs/nodes (e.g. Wifi nodes) may acquire the channel after downlink transmission ends, and during the transmission gap. This may not allow a UE to acquire the channel and transmit uplink data if the UE is granted an uplink resource after a downlink burst. For example, transmission of reservation signals by a UE may enable to reserve the channel earlier and subsequently transmit uplink data.

In an LAA system, when an eNB transmits a full downlink subframe, the next available subframe for uplink transmission may be a partial uplink subframe due to transmission gap and NTA requirements. In an LAA system, when an eNB transmits an end partial downlink subframe, the next available subframe for uplink transmission may be a full or partial uplink subframe due to transmission gap and NTA requirements.

An eNB may need to schedule an uplink transmission on a last subframe of an uplink burst that ends before the last symbol of a subframe, for example ends at the end of the first slot of the uplink subframe, or at symbol 10, 12, 13, etc.

In an example, an uplink DCI grant may include explicit indication that the grant is for a partial subframe. An eNB may transmit to a UE an uplink DCI grant comprising an allocation of resource blocks for transmission of uplink data in a first subframe of an LAA cell. The uplink DCI grant may further comprise a first field comprising an index indicating a starting position (time). The starting position (time) is one of a plurality of pre-configured allowed starting positions (times). The uplink DCI grant may further comprise a second field indicating an ending symbol. The ending symbol is one of a plurality of pre-configured allowed ending symbols. The index may identify an allowed starting symbol/time of a plurality of starting symbols/times for transmission of uplink signals (data/reservation signals). For example, an RRC message may comprise (and configure) one or more allowed starting symbols/times identified by indexes and/or allowed ending symbols identified by indexes. The starting time may be for a reservation signal and/or for data transmission.

Example embodiment reduces uplink DCI grant size and reduces downlink signaling overhead. An index identifies one of the pre-configured allowed starting positions. Using an index and limiting the number of possible starting positions reduces the number of bits for the first field in the DCI. For example, a 2-bit index may indicate four starting positions. Also reducing the allowed ending symbol positions reduces the number of bits for encoding the second field. Example embodiments reduce the required number of bits in the first field and the second field and enhances downlink control channel capacity.

The wireless device may perform, on the LAA cell and before the starting position of the first subframe, an LBT procedure employing the LBT configuration parameters. The wireless device may start uplink transmission after the LBT procedure indicates a clear channel. A UE may prepare uplink data format and map uplink data to physical resources based, at least, on specific partial uplink subframe configuration indicated in the uplink DCI grant. The UE may map the uplink data to resource elements corresponding to the resource blocks allocated for transmission and based, at least, on the starting position and the ending symbol. The UE may map the physical uplink shared channel to resource elements of allocated resource blocks. For example, when uplink data channel starts from symbol 1, the UE may not map the uplink data to symbol 0. For example, when uplink data channel does not include the last symbol, the UE may not map the uplink data to the last symbol of the first subframe. The UE may transmit the uplink data on the LAA cell starting at the starting position and ending before the ending symbol. The UE may transmit a reservation signal when the channel is clear until the allowed symbol (time) to send data/PUSCH. The UE may start uplink data transmission at the allowed starting symbol.

Example embodiments enhances uplink data mapping to resource elements. Instead of puncturing uplink data for a partial subframe, uplink data is mapped to resource elements based on the starting and ending symbol positions. A UE may calculate the size of the uplink resources in advance and accordingly construct a data packet (Transport block) for the allocated resources. Example embodiments may reduce the probability of packet loss and retransmissions and may enhance uplink radio resource efficiency.

In an example embodiment, the downlink transmission from an eNB on an LAA cell may end with a downlink partial subframe. In this case to increase transmission efficiency, a UE may start UL transmission shortly after the end point of a DL partial subframe. To enable uplink data transmission after an end partial downlink subframe or a full downlink subframe, an eNB may indicate support for such uplink transmissions and may configure a set of available starting points for a beginning uplink partial subframes. Such configuration may be cell specific or UE specific.

In an example embodiment, one or more UEs may be scheduled to start transmission of uplink data on an uplink partial subframe. A limited number of starting points may be configured for a UE. In an example, beginning partial subframes may be based on uplink part of one or more of TDD special subframe configurations. In another example, other configurations for partial beginning uplink subframe may be configured. For example, in a system in which a subframe includes 14 symbols, an eNB may allow uplink data to be transmitted starting on symbols 4, 7, or 10 of a subframe. In an example, the UE behavior depends on whether Uplink reservation signal transmission is enabled in the uplink or not.

In an example embodiment, transmission of a UE reservation signal may be enabled. When downlink transmission ends on symbol x of a subframe, UEs scheduled to transmit after the end partial/full downlink subframe, may start LBT after k duration (for example, k=0, 20 micro seconds, 50 micro-seconds, 1 symbols, or 2 symbol, etc). The UE may transmit a reservation signal when the channel is clear until a permissible symbol (time) to send data/PUSCH. The UE may start uplink data transmission at a permissible symbol.

For example, if duration of LBT plus reservation signal is fixed, e.g. one symbol LBT and no reservation signal, the eNB may know the starting time and mapping of data may prepare to receive the uplink data accordingly. The eNB may employ the uplink reference signal to determine when the uplink subframe started and/or ended.

Figure 13:
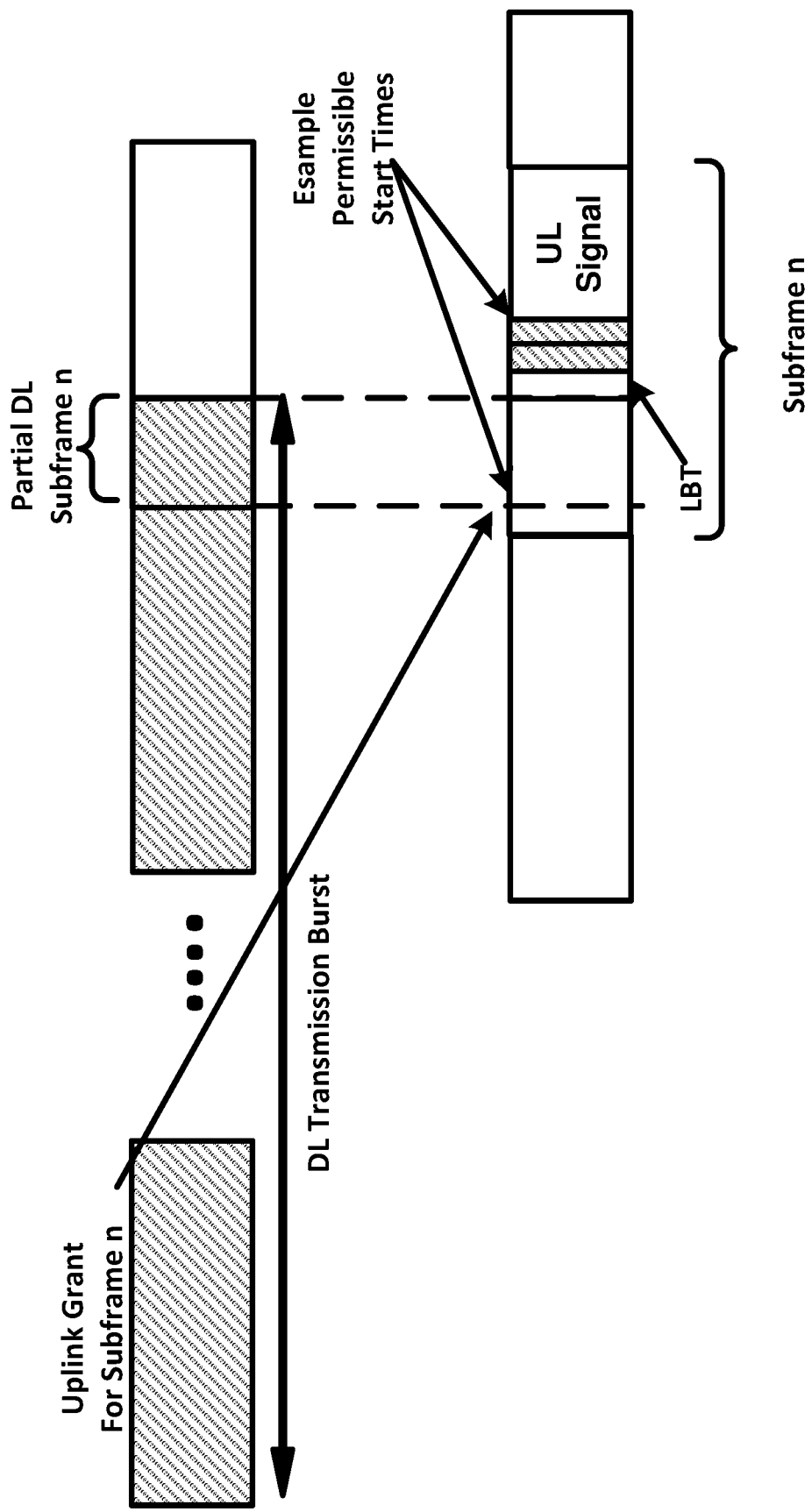
FIG. 13 is an example diagram depicting signal transmission as per an aspect of an embodiment of the present disclosure.

In an example embodiment, the starting symbol of UL data in an ending partial downlink subframe may be pre-configured. In an example embodiment, when subframe n is a partial end downlink subframe, a UE may start LBT and then transmit reservation signals until the beginning of subframe n+1 (e.g. uplink grant from the eNB may be for subframe n+1). This may happen for example when no allowable starting symbol is available in subframe n after LBT is successful. This may happen for example, when subframe n is the ending partial subframe, and the eNB may transmit a grant for subframe n+1. An eNB may know when the ending downlink partial subframe n ends. The eNB may transmit DCI grants for subframe n or n+1 depending on the ending time. FIG. 13 illustrates LBT procedure and uplink transmission on subframe comprising a partial DL subframe.

In an example embodiment, an eNB may transmit reservation signals in one or more subsequent symbols after the ending downlink partial subframe to reserve the channel and not allow other unwanted UEs or nodes (e.g. WiFi nodes) to acquire the channel. This may depend on eNB implementation as well as maximum transmission time allowed by the eNB. The eNB may not be able to send terminal reservation signals when the maximum downlink transmission duration is reached.

Figure 14:
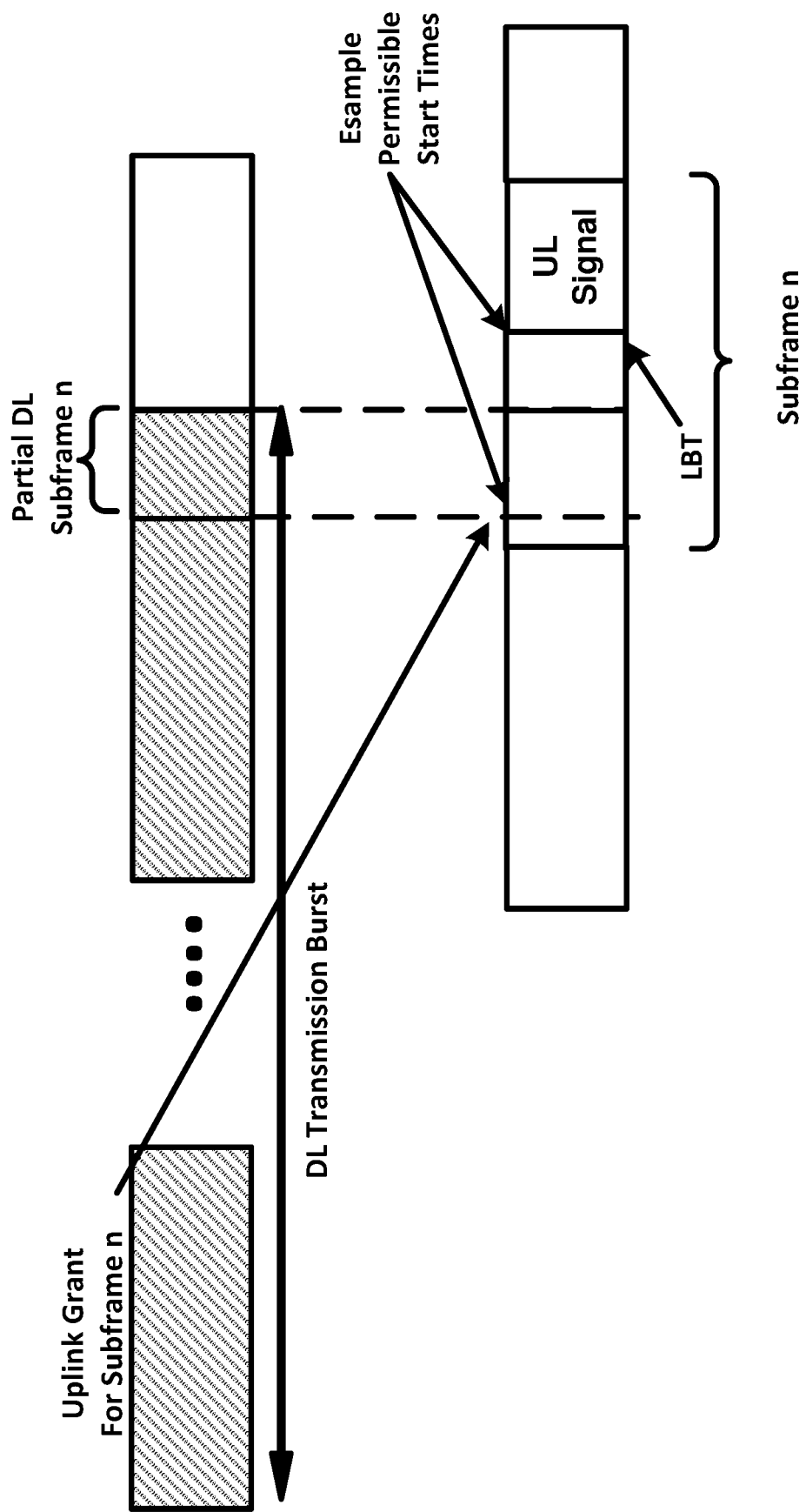
FIG. 14 is an example diagram depicting signal transmission as per an aspect of an embodiment of the present disclosure.

In an example embodiment, transmission of UE reservation signal may not be enabled. In this case UEs scheduled to transmit in UL on subframe n when downlink part ends on symbol x, may wait until an earliest allowed permissible start time (symbol) for uplink data transmission. UEs may run LBT during a time interval before transmitting data on symbol y. In an example, the eNB may transmit a reservation signal to reserve the channel for the UE before the UE starts an LBT process. Example LBT durations are in term of symbols, in an implementation LBT duration may be in terms of micro seconds, e.g. 30, 40, 50 micro seconds. Example embodiments may be implemented according to the configured LBT process. FIG. 14 illustrates LBT procedure and uplink transmission on a subframe comprising a partial DL subframe.

According to various embodiments, a device such as, for example, a wireless device, a base station and/or the like, may comprise one or more processors and memory. The memory may store instructions that, when executed by the one or more processors, cause the device to perform a series of actions. Embodiments of example actions are illustrated in the accompanying figures and specification.

Figure 16:
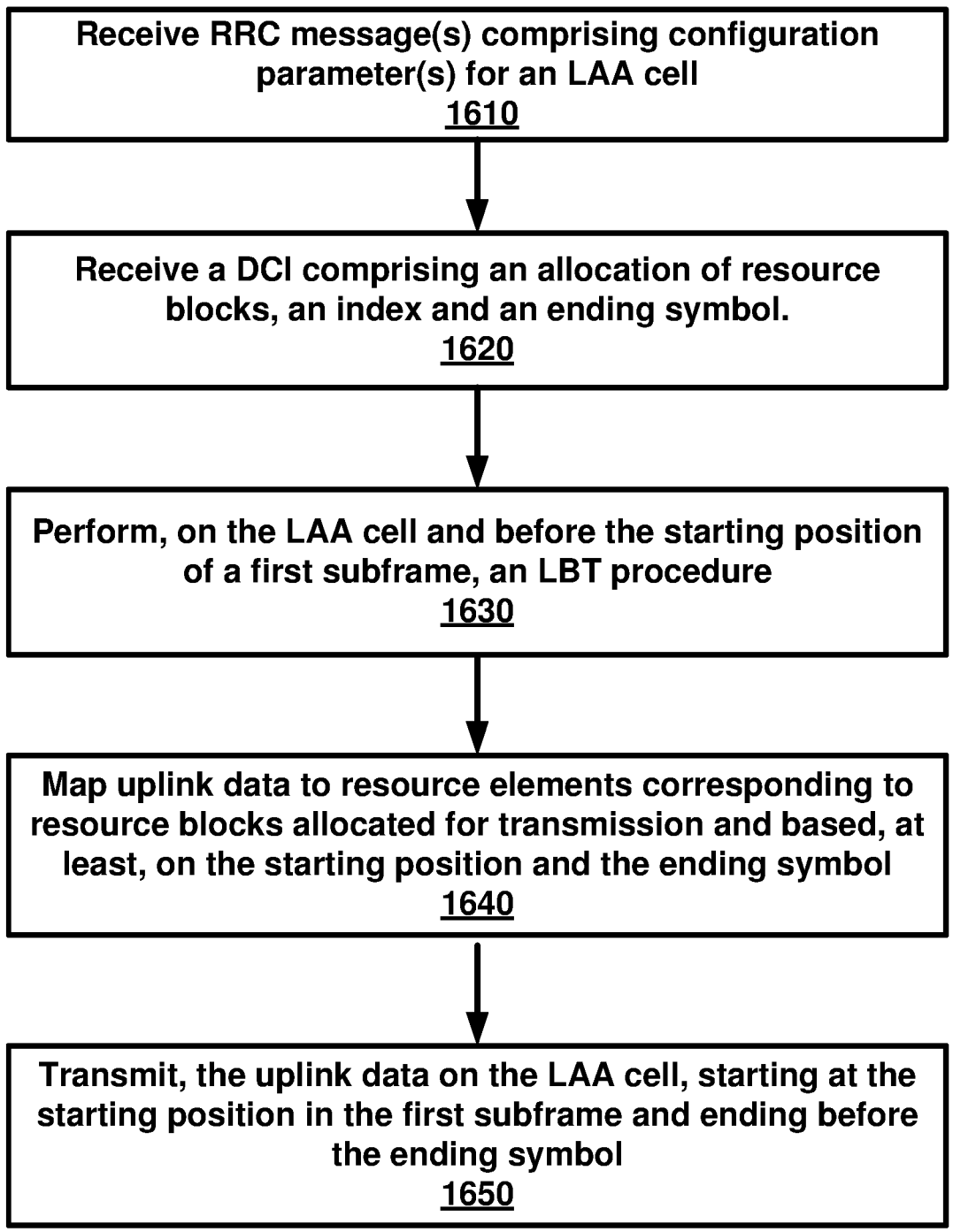
FIG. 16 is an example diagram depicting signal transmission as per an aspect of an embodiment of the present disclosure.

FIG. 16 is an example flow diagram as per an aspect of an embodiment of the present disclosure. At 1610, a wireless device may receive one or more radio resource control (RRC) messages. The at least one RRC message may comprise configuration parameters for a first licensed assisted access (LAA) cell. The one or more configuration parameters may comprise one or more listen before talk (LBT) configuration parameters. A downlink control information (DCI) may be received at 1620. The DCI may comprise: an allocation of resource blocks for transmission of uplink data in a subframe, an index indicating a starting position for the uplink data in the subframe, and a field indicating an ending symbol for the uplink data. The index may identify one of a plurality of pre-configured starting positions. The ending symbol may be one of a plurality of pre-configured ending symbols. At 1630, the wireless device may perform, on the LAA cell and before the starting position of the subframe, an LBT procedure employing the one or more LBT configuration parameters. The LBT procedure may indicate a clear channel. At 1640, the wireless device may map the uplink data to resource elements corresponding to the resource blocks allocated for transmission and based, at least, on the starting position and the ending symbol. At 1650, the wireless device may transmit the uplink data on the LAA cell starting at the starting position in the subframe and ending before the ending symbol.

The subframe may be, for example, a starting subframe of a multi-subframe burst. According to an embodiment, the transmitting of the uplink data may comprise: transmitting a reservation signal until an allowed symbol for a physical uplink shared channel transmission, and transmitting data symbols starting from the allowed symbol. The reservation signal duration may be, for example, less than one symbol. The starting position may be, for example, based on a value of an uplink timing advance calculated by the wireless device. The DCI may comprise, for example, an LBT parameter. The DCI may comprise, for example, a transmit power control (TPC) command. The configuration parameters may comprise, for example, uplink transmission parameters. The DCI may indicate, for example, a starting time for the LBT procedure. A starting time for the LBT procedure may be at, for example, a pre-determined time before the starting position.

Figure 17:
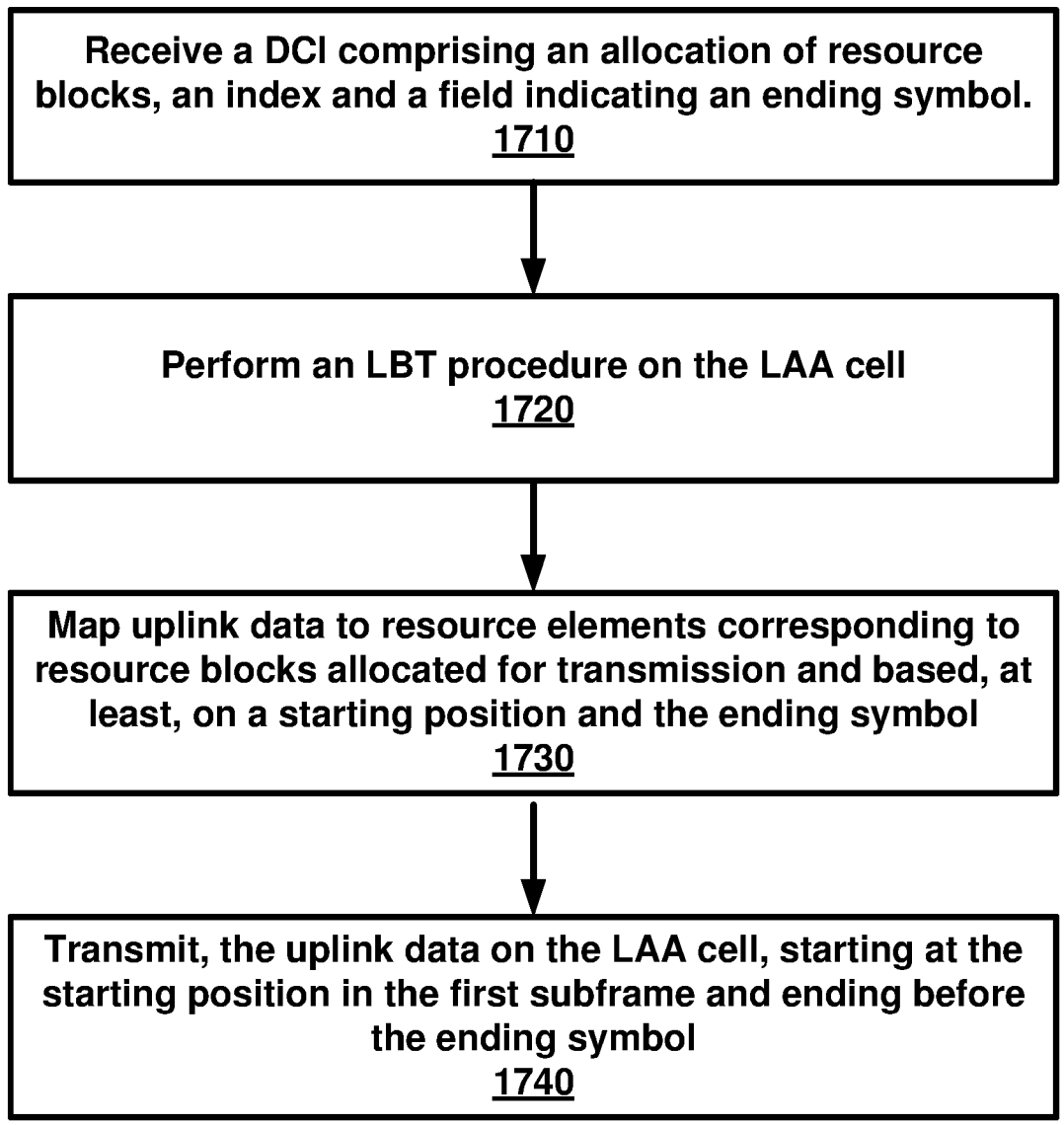
FIG. 17 is an example diagram depicting signal transmission as per an aspect of an embodiment of the present disclosure.

FIG. 17 is an example flow diagram as per an aspect of an embodiment of the present disclosure. At 1710, a wireless device may receive one or more DCI. The one or more DCI(s) may comprise: an allocation of resource blocks for transmission of uplink data in a subframe of a licensed assisted access (LAA) cell, an index indicating a starting position for the uplink data in the subframe, and a field indicating an ending symbol for the uplink data. The index may identify one of a plurality of pre-configured starting positions. The ending symbol may be one of a plurality of pre-configured ending symbols. At 1720, the wireless device may perform an LBT procedure on the LAA cell. The LBT procedure may indicate a clear channel. At 1730, the wireless device may map the uplink data to resource elements corresponding to the resource blocks allocated for transmission and based, at least, on the starting position and the ending symbol. At 1740, the wireless device may transmit, the uplink data on the LAA cell, starting at the starting position in the subframe and ending before the ending symbol.

Figure 18:
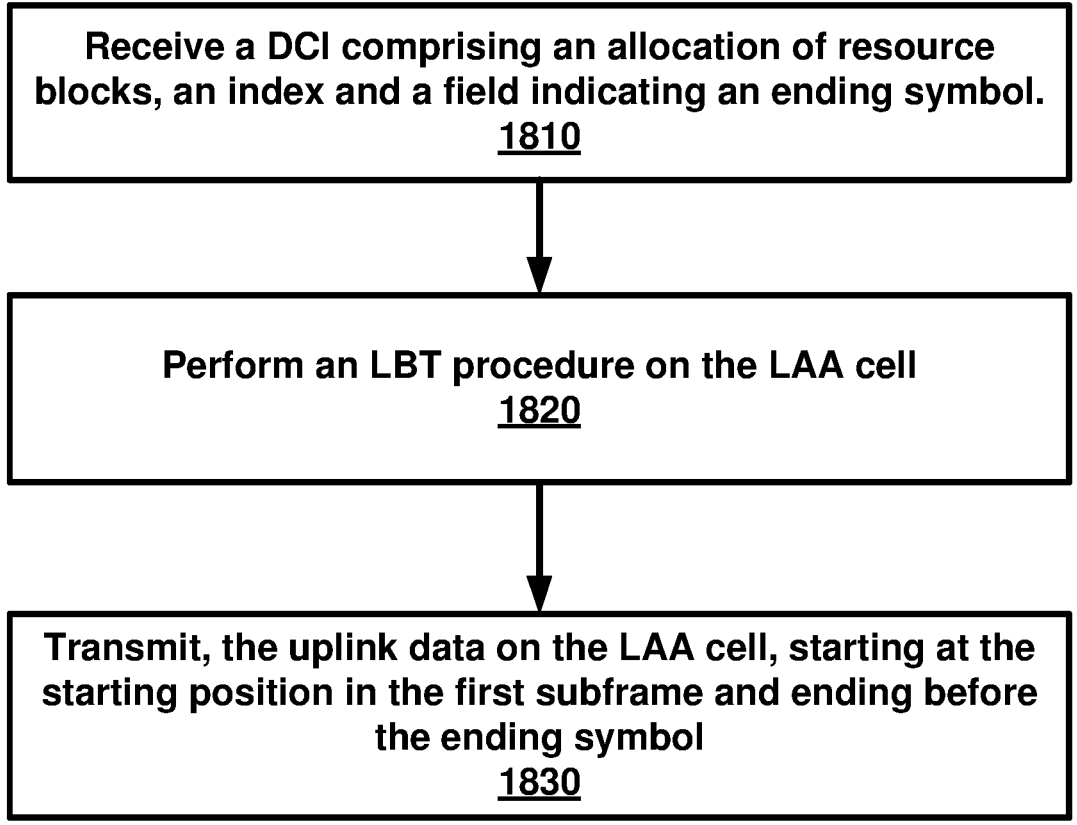
FIG. 18 is an example diagram depicting signal transmission as per an aspect of an embodiment of the present disclosure.

FIG. 18 is an example flow diagram as per an aspect of an embodiment of the present disclosure. At 1810, a wireless device may receive one or more DCI. The one or more DCI(s) may comprise: an allocation of resource blocks for transmission of uplink data in a subframe of a licensed assisted access (LAA) cell, an index indicating a starting position for the uplink data in the subframe, and a field indicating an ending symbol for the uplink data. The index may identify one of a plurality of pre-configured starting positions. The ending symbol may be one of a plurality of pre-configured ending symbols. At 1820, the wireless device may perform an LBT procedure on the LAA cell. The LBT procedure may indicate a clear channel. At 1830, the wireless device may transmit, the uplink data on the LAA cell, starting at the starting position in the subframe and ending before the ending symbol.

Figure 19:
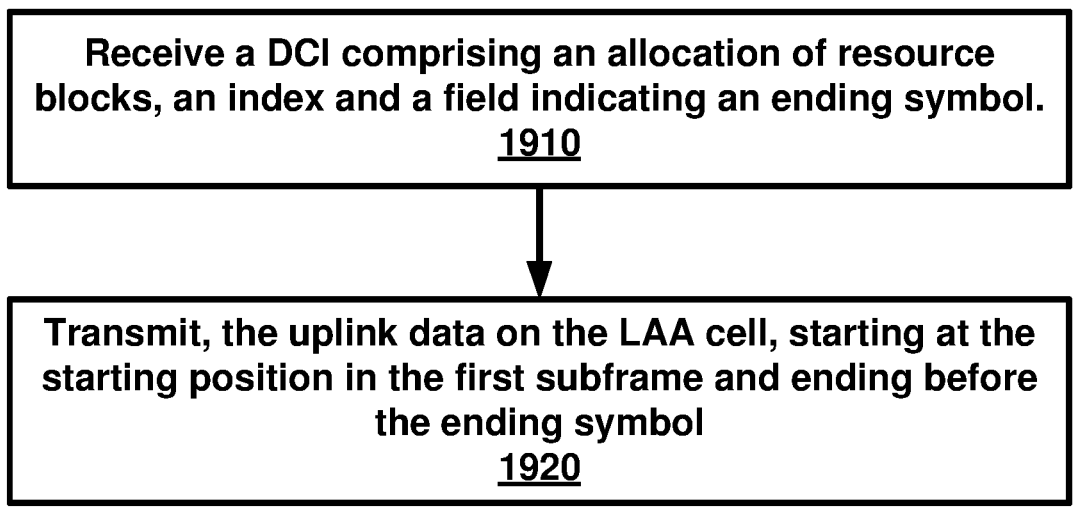
FIG. 19 is an example diagram depicting signal transmission as per an aspect of an embodiment of the present disclosure.

FIG. 19 is an example flow diagram as per an aspect of an embodiment of the present disclosure. At 1910, a wireless device may receive one or more DCI. The one or more DCI(s) may comprise: an allocation of resource blocks for transmission of uplink data in a subframe of a licensed assisted access (LAA) cell, an index indicating a starting position for the uplink data in the subframe, and a field indicating an ending symbol for the uplink data. The index may identify one of a plurality of pre-configured starting positions. The ending symbol may be one of a plurality of pre-configured ending symbols. At 1920, the wireless device may transmit, the uplink data on the LAA cell, starting at the starting position in the subframe and ending before the ending symbol.

Figure 20:
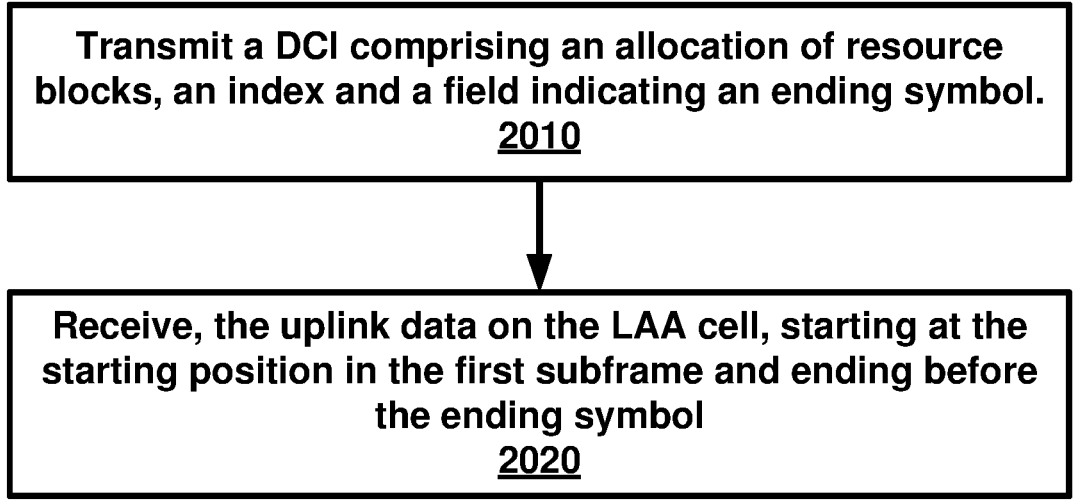
FIG. 20 is an example diagram depicting signal transmission as per an aspect of an embodiment of the present disclosure.

FIG. 20 is an example flow diagram as per an aspect of an embodiment of the present disclosure. At 2010, a base station may transmit one or more DCI. The one or more DCI may comprise: an allocation of resource blocks for transmission of uplink data in a subframe of a licensed assisted access (LAA) cell, an index indicating a starting position for the uplink data in the subframe, and a field indicating an ending symbol for the uplink data. The index may identify one of a plurality of pre-configured starting positions. The ending symbol may be one of a plurality of pre-configured ending symbols. At 2020, the base station may receive, the uplink data on the LAA cell, starting at the starting position in the subframe and ending before the ending symbol.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the disclosure may also be implemented in a system comprising one or more TDD cells (e.g. frame structure 2 and/or frame structure 3-licensed assisted access). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device, a downlink control information comprising:
      an allocation of resource blocks for transmission of uplink data via a transmission time interval (TTI) of an unlicensed cell;
      a first field comprising an index indicating a starting position for the transmission of the uplink data, the index identifying one of pre-configured starting positions; and
      a second field indicating an ending symbol for the transmission of the uplink data, the ending symbol being one of pre-configured ending symbols;
   performing, based on the starting position of the TTI, a listen-before-talk procedure indicating a clear channel; and
   transmitting, the uplink data via the resource blocks of the unlicensed cell, based on the starting position and the ending symbol.

2. The method of claim 1, wherein the transmitting the uplink data further comprises:
   transmitting a reservation signal until an allowed symbol for a physical uplink shared channel transmission; and
   transmitting data symbols starting from the allowed symbol.

3. The method of claim 2, wherein a duration of the reservation signal is less than one symbol.

4. The method of claim 1, wherein the starting position is based on a value of an uplink timing advance calculated by a wireless device.

5. The method of claim 1, wherein the downlink control information comprises a listen-before-talk parameter.

6. The method of claim 1, wherein the downlink control information comprises a transmit power control command.

7. The method of claim 1, further comprising receiving uplink transmission parameters for the unlicensed cell.

8. The method of claim 1, wherein the downlink control information indicates a starting time for the listen-before-talk procedure.

9. The method of claim 1, wherein a starting time for the listen-before-talk procedure is at a pre-determined time before the starting position.

10. A wireless device comprising:
   one or more processors; and
   memory storing instructions that, when executed by the one or more processors, cause the wireless device to:
      receive a downlink control information comprising:
         an allocation of resource blocks for transmission of uplink data via a transmission time interval (TTI) of an unlicensed cell;

a first field comprising an index indicating a starting position for the transmission of the uplink data, the index identifying one of pre-configured starting positions; and a second field indicating an ending symbol for the transmission of the uplink data, the ending symbol being one of pre-configured ending symbols;

perform, based on the starting position of the TTI, a listen-before-talk procedure indicating a clear channel; and transmit, the uplink data via the resource blocks of the unlicensed cell, based on the starting position and the ending symbol.

11. The wireless device of claim 10, wherein the instructions, when transmitting the uplink data, further cause the wireless device to:

transmit a reservation signal until a first allowed symbol for a physical uplink shared channel transmission; and transmit data symbols starting from the first allowed symbol.

12. The wireless device of claim 11, wherein a duration of the reservation signal is less than one symbol.

13. The wireless device of claim 10, wherein the starting position is based on a value of an uplink timing advance calculated by the wireless device.

14. The wireless device of claim 10, wherein the downlink control information comprises a listen-before-talk parameter.

15. The wireless device of claim 10, wherein the downlink control information comprises a transmit power control command.

16. The wireless device of claim 10, wherein configuration parameters for the unlicensed cell comprise uplink transmission parameters.

17. The wireless device of claim 10, wherein the downlink control information indicates a starting time for the listen-before-talk procedure.

18. The wireless device of claim 10, wherein a starting time for the listen-before-talk procedure is at a pre-determined time before the starting position.

* * * * *